United States Patent [19]

Fay

[11] 3,783,772

[45] Jan. 8, 1974

[54] SANDWICH MACHINE

[76] Inventor: Rudolph J. Fay, 6911 Wildflower Trail, Cincinnati, Ohio 45230

[22] Filed: Sept. 17, 1971

[21] Appl. No.: 181,476

[52] U.S. Cl.................. 99/450.4, 99/450.7, 198/21, 198/24, 198/30, 198/34
[51] Int. Cl.......................... A21c 15/04, A21c 9/08
[58] Field of Search....................... 99/450.4, 450.5, 99/450.7, 443 C; 198/21, 24, 30, 34, 84

[56] References Cited
UNITED STATES PATENTS

| 2,817,306 | 12/1957 | Oakes | 99/450.4 |
| 3,266,442 | 8/1966 | Udall et al. | 99/450.4 X |
| 2,206,313 | 7/1940 | Werner | 99/450.4 X |
| 3,040,867 | 6/1962 | Posten et al. | 198/24 X |
| 3,635,638 | 1/1972 | Bryan | 198/34 X |
| 1,575,207 | 3/1926 | Hungerford | 99/450.4 |

Primary Examiner—Robert W. Jenkins
Assistant Examiner—Alan I. Cantor
Attorney—Wood et al.

[57] ABSTRACT

A sandwich making machine for receiving columns of objects in irregularly spaced and misaligned rows and for automatically aligning those rows, applying topping to alternate ones of the rows, and layering the alternate untopped rows onto the top rows. The machine comprises a reciprocating feeder bar operable upon detection of a predetermined weight of objects at the infeed station to push the objects forwardly onto a continuously moving endless belt conveyer. Simultaneously with the actuation of the pusher bar, a memory circuit is actuated to record the position of the objects on the conveyer. This memory circuit then controls the application of the topping to alternate rows of objects and subsequent pickup, inversion and layering of untopped rows of objects onto topped rows.

27 Claims, 5 Drawing Figures

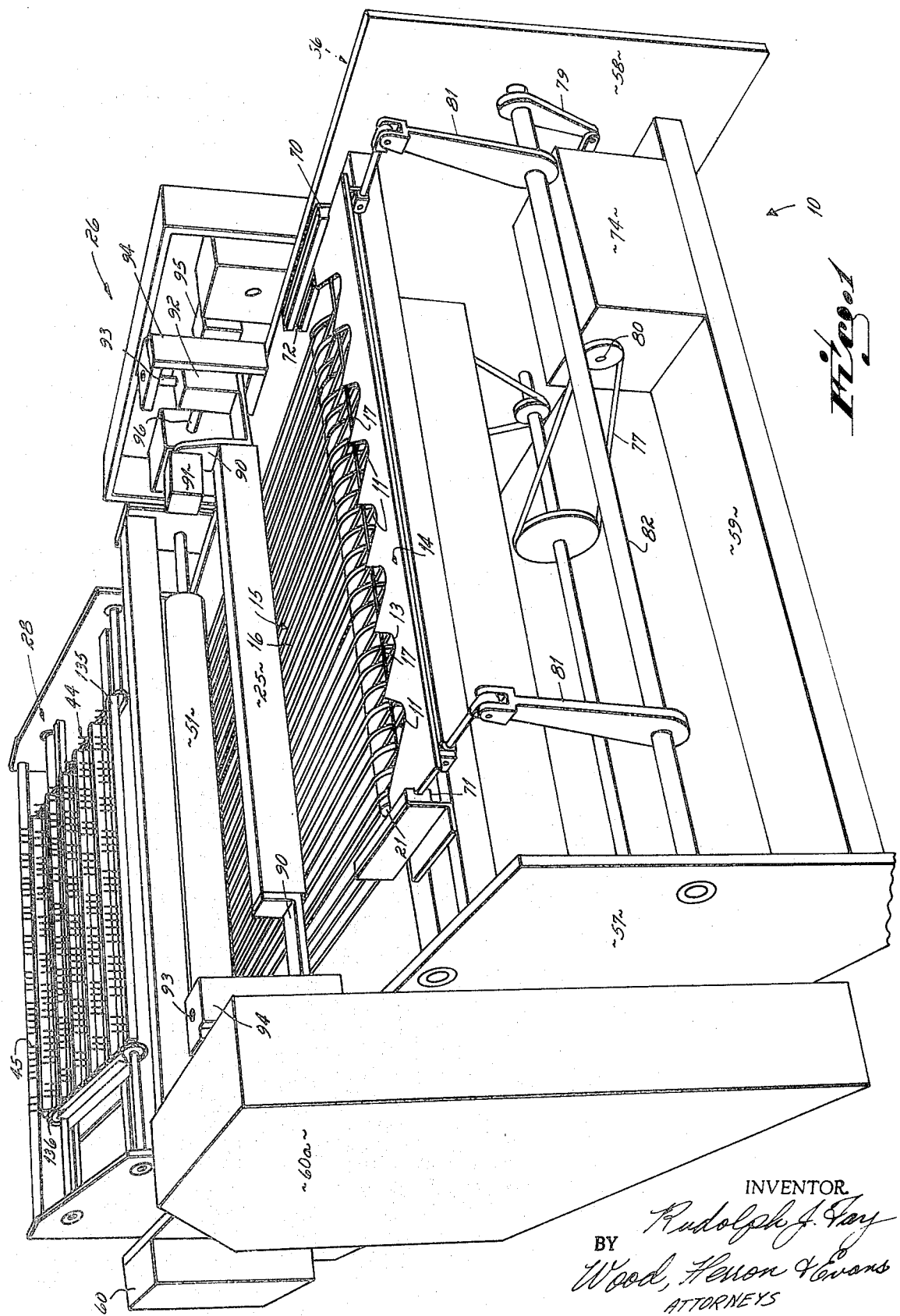

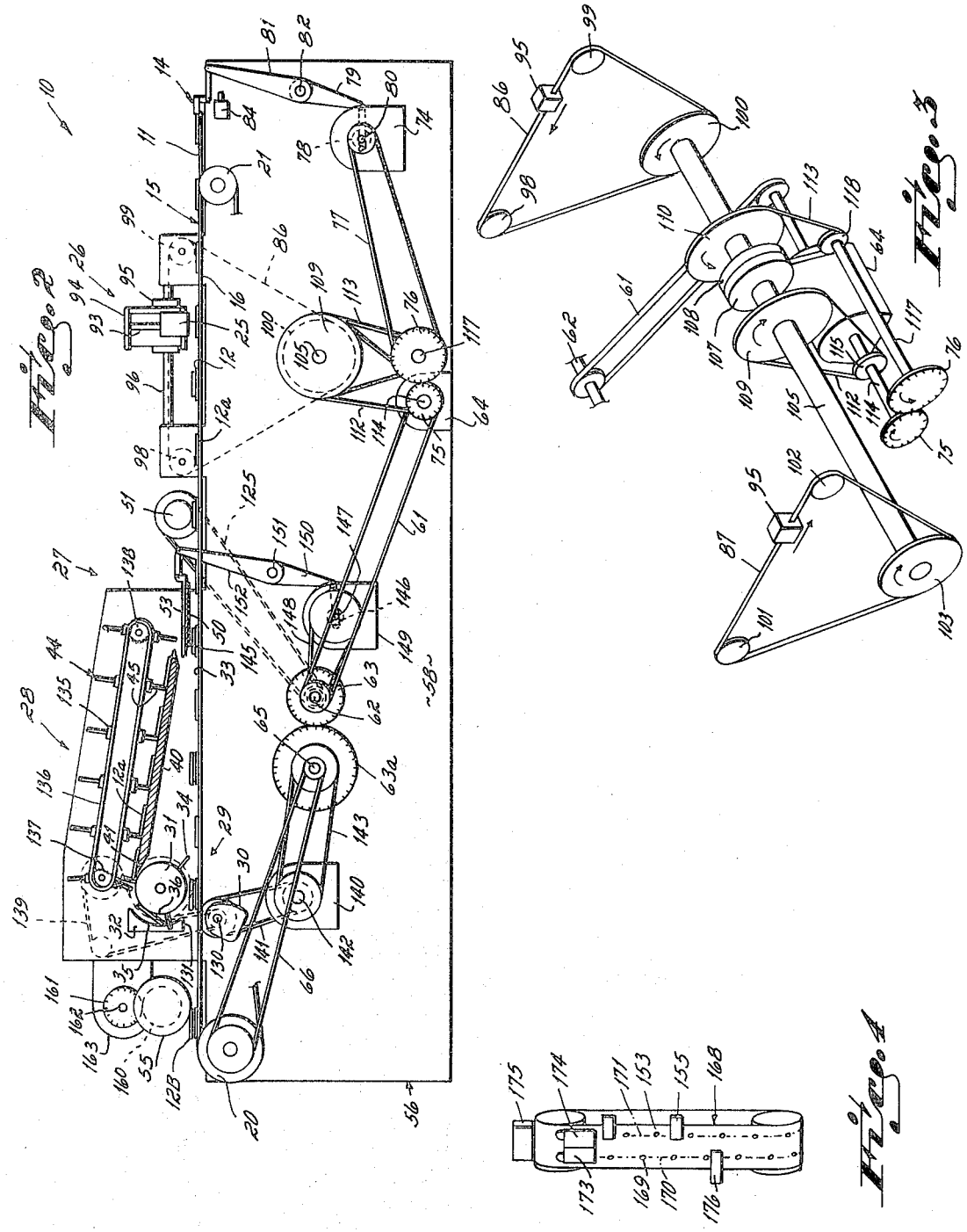

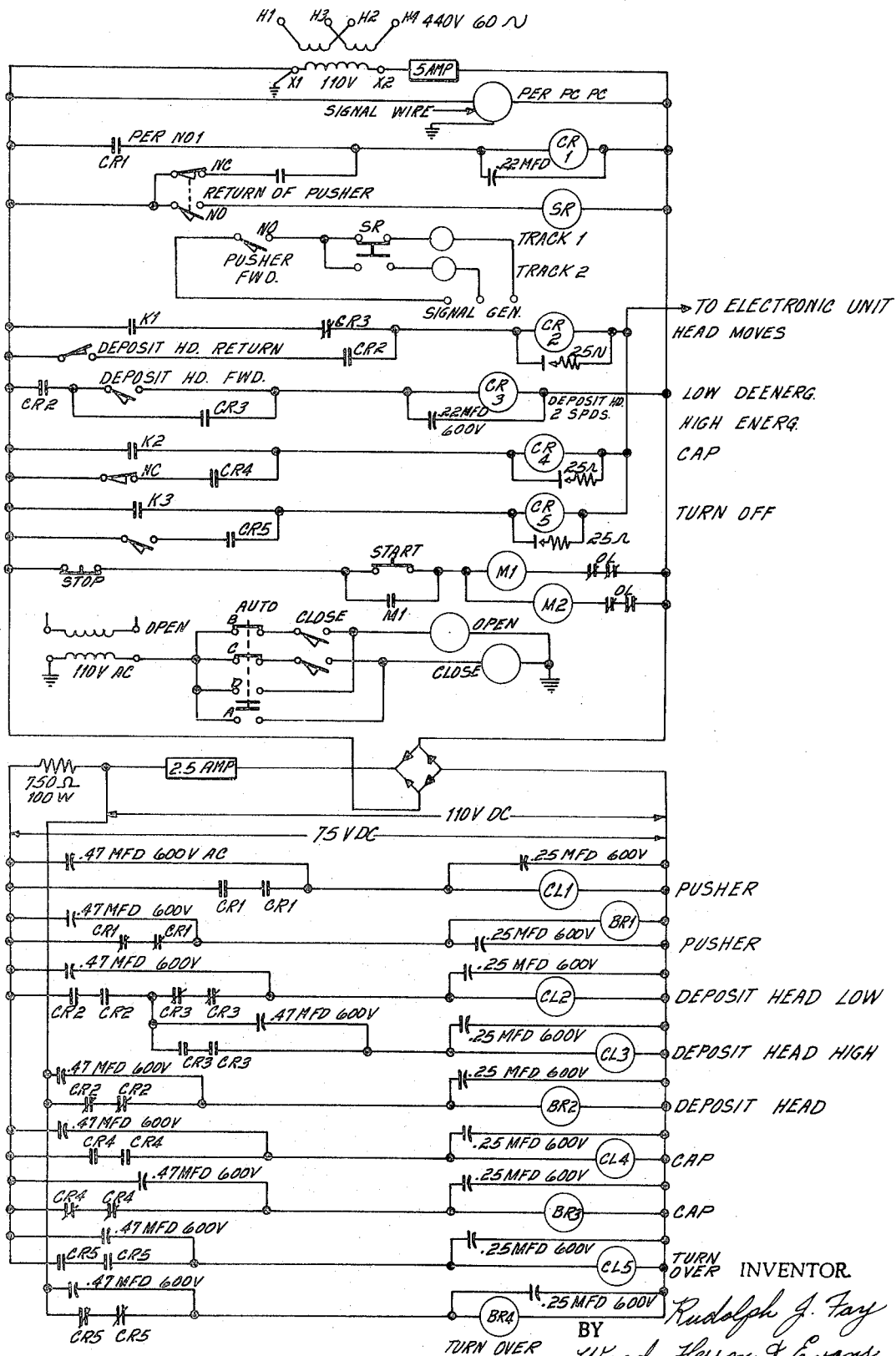

SANDWICH MACHINE

BACKGROUND OF THE INVENTION

This invention relates to cookie or cake topping machines and particularly to machines for both topping and layering objects so as to make sandwiches of them.

At the present time the most popular commercial sandwich making machine is one which requires hand feeding of the cakes or cookies into two rows or banks of magazines. A reciprocating feed bar feeds the cakes or cookies out of the bottom of the first row of magazines onto a conveyer which then conveys the resulting row of cookies or cakes through the machine. In the course of passing through the machine, marshmallow topping or some other topping is placed on the row of cakes after which they are fed beneath the second row of magazines at a layering station. At this layering station, untopped cakes are fed from the bottom of the second bank of magazines onto the top of the topping on the bottom row of cakes and the topped cakes are then pushed forward and out of the machine.

These commercial machines require at least two persons to manually feed cakes or cookies into the magazines. They are also limited in the types of cookies or cakes which may be assembled into sandwiches; specifically, to hard or relatively hard cookies or cakes which will not crumble upon being fed into or out of a gravity feed magazine.

Magazines are used to hold and feed cookies into the commercial machine described hereinabove because the cookies come off a cooling oven conveyer in the bakery in misaligned rows and quite often in rows which vary all over the map in spacing. Some rows may be spaced on 8 inch centers and other rows on 13 inch centers. The misalignment and the odd spacing of the rows occurs as a result of the cookies or cakes being shifted from one conveyer to another and from overhead conveyers to ground level conveyers in the course of moving through the bakery. As rows of cookies drop off one conveyer onto another, they tend to become misaligned although they are still identifiable as rows. Generally, the misalignment is no more than the diameter of a single cookie.

Additionally, it has heretofore been impractical to synchronize the speed of the oven or cookie or cake manufacturing equipment with the speed of the sandwich making equipment.

Because of the misalignment of the rows and of the varying spacing of the centers between the rows, and because of the inability to match oven speeds with sandwich making equipment speeds, no sandwich making machine has heretofore been capable of handling the cookies without going through the stage of having the cookies collected and manually placed in a feeder magazine. It has therefore been a principal objective of this invention to provide an automatic sandwich making machine which completely eliminates all handling of the cookies or cakes and which accepts misaligned and unevenly spaced rows.

One important aspect of this invention is predicated upon the concept of synchronizing the speed of the sandwich making machine with a random arrival rate of incoming products.

In order to accept misaligned and unevenly spaced rows of objects arriving into the machine at a random rate, the machine of this invention has a weight-actuated trigger for initiating pusher movement to feed aligned rows of objects into the machine. Objects are fed into pockets of the pusher bar beneath which there are steel fingers. A wire extends over the fingers just out of contact with them. When three or more objects are located on the top of the wire, the weight is sufficient to ground it. This triggers the machine start signal which after a predetermined delay (a time equal to approximately the time for a single object to move one diameter forward), the pusher feeds a row of objects forward onto the machine belt conveyer. This conveyer then transports the row of objects in perfect alignment forwardly beneath a topping-depositing head. Topping is deposited on alternate rows of objects. The topped rows are then conveyed forwardly beneath a leveling roller and into a sandwich station. At the sandwich station those rows which have topping thereon are layered or covered by a second inverted row of untopped objects while they continue to move forwardly through the machine. Thereafter, the completed sandwiches are moved forwardly and out of the machine.

The alternate rows which receive no topping move through the sandwich station without having a top layer or object placed thereon. When they reach the output end of the machine, they are picked up, conveyed upwardly and rotated through 180° onto an upper conveyer which then moves them back upstream to the sandwich station. At the sandwich station a second pusher bar pushes the rows of untopped objects off a deadplate onto the topped rows as the topped rows pass beneath the deadplate.

The programming of the machine enables it to top and layer unevenly spaced rows of cookies, the spacing of which is unknown and which may have cumulative error built in from some norm or average spacing. The feeder bar moves forwardly whenever a full row arrives at an infeed end of the machine. Simultaneously with the movement of the feeder bar, a switch of a memory circuit causes a magnetic head to place a signal on a continuously running magnetic tape. This tape is synchronized with the belt conveyer of the sandwich machine such that the belt makes one revolution for each complete cycle of the machine. There are two bands on the tape and the magnetizing head places a signal on alternate bands each time the pusher feeds a row of cookies into the machine. Readout heads appropriately spaced along the tape are triggered by these magnetic signals and actuate the topping head, the second feeder or pusher bar, the pickup mechanism, and the layering mechanism in synchronization with arrival of the row of cookies at each of the stations.

The primary advantage of this machine resides in its elimination of hand labor heretofore required to load cakes or cookies into the magazines of sandwich machines. Additionally, this machine has the advantage of enabling soft, lightweight cookies or cakes which heretofore could not be handled automatically in gravity feed machines to be automatically handled and automatically made up into sandwiches.

These and other objects and advantages of this invention will be more readily apparent from the following description of the drawings in which:

FIG. 1 is a perspective view of a machine incorporating the invention of this application.

FIG. 2 is a partially diagrammatic cross sectional view through the machine of FIG. 1.

FIG. 3 is a perspective view of the drive to the topping section of the machine.

FIG. 4 is a diagrammatic view of the memory portion of the electric control circuit for controlling the cycling of the machine of FIG. 1.

FIG. 5 is a circuit diagram of the control circuit for controlling the cycling of the machine.

GENERAL ORGANIZATION

The machine depicted in FIG. 1 is adapted to receive rows of cookies or cakes or other objects arranged in columns and rows from an infeed conveyer (not shown) and to form those rows of objects into sandwiches. This machine is particularly suited to the automatic manufacture of sandwich type cakes from bakery products, as for example, the manufacture of small cookie type sandwiches having filling such as marshmallow or peanut butter, in the middle of the sandwich.

In most modern bakeries the baked products are automatically conveyed into and out of the bakery ovens. After the products are baked they are automatically transported to a cooling conveyer. The products are then conveyed on this conveyer through the plant to subsequent topping or packaging stations. In the course of passage over the cooling conveyers, the rows of cookies remain in relatively even columns but the rows become misaligned. This misalignment occurs as a result of the cookies or objects passing off one conveyer onto another. During passage between the conveyers, some cookies in the same row move forwardly while others move rearwardly relative to each other. As a result, by the time the cookies reach the end of the cooling conveyer, the rows are recognizable as rows but there may be as much as a cookie diameter misalignment in a single row. Additionally, this spacing of the rows at the end of the conveyer is very uneven.

The machine depicted in FIG. 1 automatically accepts the misaligned rows of cookies irrespective of the uneven spacing between the rows, corrects the misalignment, and then feeds the aligned rows of cookies through the machine.

An incoming row of cookies is fed from the bakery cooling oven conveyer into the sandwich machine 10. Upon arriving at the infeed end of the machine, the incoming row of cookies is dropped onto a series of supporting rods 11 in front of a pusher plate 14. As dropped onto the rods, each cookie of a row of cookies 12, 12a falls in front of a pocket or recess 13 at the forward end of the pusher plate 14. This pusher plate is reciprocable and is operable when moved forwardly to push the row of cookies located in the pockets 13 forwardly onto a continuously moving main conveyer 15 of the machine 10.

Reciprocation of the pusher plate 14 is controlled by a trigger circuit operative upon arrival of a row of cookies in front of the pusher plate to move forwardly and push the row of cookies over the rods 11 onto the conveyer 15. The trigger circuit comprises an electrically conductive metal wire 17 which extends transversely over the fixed rods 11 and which is tensioned so that it is located out of contact with the rods 11. The rods 11 are also electrically conductive. When cookies fall into the pockets 13, the weight of the cookies is sufficient to overcome the tension on the wire 17 and move it downwardly into contact with the rods 11. The contact of the wire 17 with the rods 11 causes the wire to be grounded. Grounding of the wire 17 triggers a control circuit (FIG. 5) which in turn initiates forward movement of the pusher plate 14.

In the preferred embodiment, there are eight pockets 13 on the front side of the pusher plate. The wire 17 is preferably tensioned so that the weight of three cookies in the pockets 13 is sufficient to ground the wire. Since the lead cookie in a row seldom leads the other cookies of the same row by more than one cookie diameter, the control circuit has a built-in time delay operable to move the plate 14 forwardly only after a time equal to the time required for the cookies to move forward approximately one cookie diameter on the infeed conveyer. Consequently, after the grounding of the wire 17, the pusher plate delays long enough for a row to move one diameter and then moves forwardly to push the incoming row of cookies onto the main conveyer 15.

As explained more fully hereinafter, an electronic control circuit is also triggered each time the pusher plate 14 is moved forwardly so as to actuate a memory circuit and initiate a machine cycle. Consequently, this pusher plate infeed arrangement and control enables the sandwich machine to operate and automatically form sandwiches irrespective of the spacing of the rows of cookies on the infeed conveyer and irrespective of any misalignment in the rows. It also automatically cycles in accordance with the arrival rate of cookies irrespective of what that arrival rate might be.

The main infeed conveyer 15 of the machine comprises a plurality of parallel running endless belts. Together these endless belts, which in a preferred embodiment are spaced approximately 1/2 inch apart, form a single main feed conveyer 15 which stretches from a drive roller 20 at the forward end of the machine to and around an idler roller 21 at the rear or infeed end of the machine. The conveyer 15 is continuously moving so that the remainder of the machine cycles according to a timing schedule initiated by forward movement of the pusher plate 14 and placement of a row of cookies on the conveyer 15 as is explained more fully hereinafter.

In the course of moving forward on the infeed conveyer 15, every other row of cookies 12 receives topping, as for example, marshmallow topping or peanut butter topping or any other conventional icing-like topping at a topping station 26. As the alternate rows 12 pass beneath a topping head 25 at a topping station 26, the topping head moves forwardly with the rows 12 while a valve in the bottom of the head opens and the topping material is ejected through nozzles onto the tops of the cookies in the row 12. The machine is so cycled that only alternate rows 12 of cookies receive the topping. The other rows 12a pass through the topping station 26 without having topping applied.

The untopped rows 12a of cookies pass through a layering or sandwich making station 27 of the conveyer without stopping and without having anything done to them. They continue to move forwardly on the machine until they near the front end of the machine. At that point, the untopped rows of cookies are picked up and inverted and returned via a return conveyer 28 to the layering or sandwich station 27. Inversion of the untopped rows 12a of cookies occurs simultaneously with pick up of the cookies and transport to the return conveyer 28. To effect the inversion and the movement to the return conveyer 28, there is a lifter cam 30, a pinwheel 31, and a guide cam 32 located at the pickup and inversion station 29 at the front of the machine. The lifter cam 30 is located beneath the upper run 33 of the main conveyer 15. It is sectionalized so that its radial outer sections may pass upwardly between the individual belts 16 of the conveyer. As its outer section moves upwardly between the belts, it engages the leading edge of the untopped row 12a of cookies and lifts the leading edges upwardly onto the lower edge of the guide cam 32. Pins 34 of the pinwheel 31 then engage the trailing edge of the untopped rows of cookies and push those trailing edges upwardly, thereby forcing the cookies to follow the generally arcuate contour of the cam surface 35 of the cam plate 32.

The cam plate 32 is made up from a series of individual plates such that the pins 34 of the pinwheel 31 may pass between the individual plates. The untopped cookies are then conveyed upwardly on the pins 34 of the pinwheel 31 until what had been the top surface of the untopped cookies rests against the circumference 36 of the pinwheel. When the cookies reach the top of the pinwheel, they are inverted. Upon continued movement of the cookies past the top of the pinwheel, the cookies move onto a downwardly and rearwardly inclined plate 40, the forwardmost end 41 of which rests immediately against the circumference 36 of the pinwheel. The plate 40 is also made up of a series of parallel individual plates spaced apart so that the pins 34 of the pinwheel 31 may pass between them. After being placed upon the plate 40 the uptopped cookies are moved rearwardly on the plate by pusher lugs 45 of the return conveyor 28.

The lifter cam 30, the pinwheel 31, and the return conveyer 28 all move intermittently and cycle only upon arrival of a row of untopped cookies over the lifter cam 30. Consequently, once the machine is fully loaded, there is a row of cookies located immediately in front of each row 44 of lugs 45 on the return conveyer 28.

At the upstream end of the return conveyer 28, the rows of untopped cookies are pushed off one row at a time onto the top of a deadplate 50. This plate holds a row of untopped cookies in a ready position above the cookies on the main conveyer 15 until a row 12 of topped cookies passes beneath the deadplate 50. When this occurs and in synchronization with the movement of a row of topped cakes, a second pusher plate 53 moves forwardly to push the row 12a of untopped cookies from the deadplate 50 onto the top of a row 12 of topped cookies. Movement of the pusher plate 53 is synchronized with the movement of the row of topped cookies beneath the deadplate 50 so that each untopped inverted cookie on the deadplate mates with and exactly matches forward movement of the topped cookie beneath it. The two rows thus come together on the fly during continued movement of the lower row of topped cookies to make perfect rows of sandwich cookies.

Once the row 12 of topped cookies has been covered by a second row of inverted cookies at the layering station 27, it continues to move forwardly on the main conveyer 15 past the lifter cam 30 and the pinwheel 31 without having its forward movement disturbed by either of those elements 30, 31. It then passes beneath a continuously rotating flattening roller 55 and out the forward end of the machine.

Main Conveyer

The sandwich machine 10 is mounted upon a frame 56 which basically comprises a pair of main side plates 57, 58 and a plurality of connecting cross bars 59. This frame structure supports the conveyers, the drive system to the conveyers and the operating mechanism as well as the electric control panels 60, 60a of the machine.

As mentioned hereinabove, the main conveyer 15 comprises a plurality of parallel individual belts or tubes 16 which extend between the drive roller 20 and the idler roller 21. These rollers 20, 21 are in turn supported on the machine frame side plates 57, 58. In the preferred embodiment, the individual belts 16 are spaced approximately 1/2 to 3/4 inch apart so as to allow cake crumbs to drop through the conveyer as well as to permit cake handling apparatus, as for example, the cam lift 30, to pass upwardly through the belts.

The conveyer 15 is driven from the drive roller 20 which is in turn driven from a main drive motor 64 of the machine. This motor effects continuous drive to the drive roller 20 through a belt 61, a drive shaft 62, a pair of gears 63, 63a, a drive shaft 65, and a belt 66. So long as the motor is operating, the drive roller 20 continues to rotate and thereby effect continuous movement of the main conveyer 15.

Infeed Pusher Plate and Machine Trigger

Mounted on the inside of the frame side plates 57, 58 there are a pair of slideways 70, 71 which support the pusher plate 14 for reciprocating movement in ways 72 of the slideways 70, 71. These slideways 70, 71 support the pusher plate for reciprocating movement over a deadplate which supports the cookies when they arrive at the infeed end of the sandwich machine 10. The deadplate comprises a plurality of individual steel rods or fingers 11 which extend forwardly beneath the pusher plate and between each of the individual belts 16 in the main conveyer 15.

The trigger wire 17 which initiates and controls movement of the pusher plate 14 extends over the top of the rods 11 out of contact with it and beneath the individual pockets or recesses 13 of the pusher plate 14. The wire 17 is so tensioned that the weight of three cookies in any three of the eight pockets or the pusher plate is sufficient to force it downwardly and electrically ground it against the rods 11. When this occurs a time delay circuit is triggered which, after a predetermined time delay (equal approximately to the time required for the infeed conveyer to move one cookie diameter) actuates a control circuit to engage an electric clutch of a clutch and brake mechanism 74. This clutch then connects a drive from the drive motor 64 through a pair of gears 75, 76 and a belt 77 to the drive mechanism of the pusher plate. This drive mechanism includes an eccentric 78 mounted on the end of a shaft 80 driven from the clutch 74. The eccentric in turn moves through one revolution before the brake is engaged and the clutch disengaged. In the course of going through one revolution, the eccentric effects oscillation of a crank arm 79 which in turn drives a pair of crank arms 81 on a drive shaft 82. The crank arms 81 are connected to the pusher plate 14 so that oscillation of the arms 81 causes the pusher plate to move first forward and then rearward to its rearwardmost rest position preparatory to arrival of the next following row of cookies in front of the plate 14.

In the course of moving forward, the pusher plate contacts a switch 84 which actuates a memory circuit indicating the presence of a row of cookies at a particular position on the main conveyer 15. Basically, this memory circuit consists of a double track enless magnetic tape 168 (FIG. 4) drivingly connected to the main conveyer 15 so that it makes one complete revolution for each complete revolution of the main conveyer 15. Upon each closing of the switch 84, a pair of magnetic heads 173, 174 associated with the tape place a spot or signal 169 on the tape on first one track 170 and then the other 171. These magnetic signals are then indicative of the position on the conveyer 15 of the rows of cookies 12, 12a. Since the drive to the tape is synchronized with the tape to the conveyer and both make one revolution in the same period of time, the magnetic signals on the tape may then be used to drive or to control actuation of the mechanism which effect further operations on the rows of cakes as they pass downstream on the conveyer 15.

Topping Mechanism

The topping mechanism 26 is a conventional topping head which moves back and forth parallel with movement of the conveyer 15 and in synchronization with movement of alternate rows 12 of cakes beneath the head. While it is moving forwardly with the conveyer and over the top of a row of cookies, a valve (not shown) in the head opens to dispense the topping material (as for example, peanut butter or marshmallow topping) onto the row of cookies located beneath it. Simultaneously with the forward movement of the head, it is lifted upwardly away from the cakes so that it moves upwardly as the deposit grows in thickness on top of the cakes. At the forward end of its travel the valve of the head is closed and the head is returned back upstream and lowered to a position preparatory to the passage of the next alternate row of cookies beneath it. The head is elevated or moved upwardly away from the cookies prior to being returned upstream to disengage the stream of topping material ejected from the nozzles of the head from the cookies and prevents the stream from dripping out over the rear edges of the cookies.

Referring to FIG. 1, it will be seen that the topping head 25 is supported at its opposite ends by generally L-shaped plates 90, one of which has a valve actuator 91 supported above the head 25. The outermost ends of the brackets 90 terminate in slide blocks 92 vertically movable over vertical guide rods 93. These guide rods are supported in C-shaped brackets 94 which are in turn carried by horizontally slidable blocks 95. The blocks 95 are carried on slideways 96. Blocks 92 have rollers (not shown) movable within cam grooves of a stationary profile cam (not shown) which control vertical displacement of the blocks 92 and thus of the depositing head 25.

Horizontal movement of the icing or topping head 25 is controlled by the drive system of FIG. 3. Both of the slide blocks 95 at the opposite ends of the head 25 are secured to endless drive chains 86, 87. The chain 86 passes over a pair of idler sprockets 98, 99 and is driven from a drive sprocket 100. Similarly, the chain 87 passes over a pair of idler sprockets 101, 102 and is driven from a drive sprocket 103. Both drive sprockets are keyed to a drive shaft 105 which is driven from a pair of dual combination electric clutches and brakes 107 and 108. When the electric clutch 107 is actuated, it engages with a drive pulley 109 to couple the pulley 109 to the shaft 105 through the clutch 107. When the clutch 107 is disengaged, though, the pulley 109 rotates freely on the shaft 105. Similarly, the clutch 108 couples a pulley 110 to the drive shaft 105. The two clutches 107, 108 are connected in the electrical circuit so that only one can be energized at a time.

The pulley 109 is rotated in a clockwise direction while the pulley 110 is rotated in a counterclockwise direction by their respective drive belts 112 and 113, respectively. The belt 112 is driven from a drive shaft 114 through a pulley 115. The belt 113 is driven from the same shaft 114 but through the gear 75, 76, a drive shaft 117, and drive pulley 118. Consequently, the two pulleys 109 and 110, while both are driven from the same drive shaft 114, rotate in opposite directions with the result that when one is coupled to the shaft 105 it effects forward movement of the icing head and when the other is coupled to the same drive shaft it effects rearward movement of the head. That one of the pulleys which is connected to the drive shaft is controlled by actuation of the electric clutches 107, 108 which are in turn controlled from the memory circuit of FIG. 4 and the electric circuit of FIG. 5. That circuit is operative to move the icing head 25 forwardly and to open the valve associated with the head in synchronization of movement of every other row 12 of cakes beneath the icing head. At the end of the stroke when the icing head reaches its forwardmost or downstreammost position, the control circuit operates a solenoid valve which in turn causes the head to be lifted and then cause the head to be coupled to the drive shaft 105 through the appropriate pulley 109, 110 so as to cause it to move rearwardly back to its upstream holding position. When it reaches the upstream hold position, it is lowered preparatory to arrival of the next alternate row 12 of cookies beneath the icing head.

After the iced row of cakes has passed from the icing station it passes beneath a roller 51. This roller is constantly driven in rotation from the drive shaft 62 by a belt 125. In a preferred embodiment, this roller is cloth covered and is maintained in a wet condition so as to prevent the topping material from sticking to it. It is operative to iron out the icing and spread it evenly over the surface of the cookies or cakes as they pass beneath it.

Inverting Head and Return Mechanism

The alternate rows of cakes 12a to which no icing is applied as they pass beneath the icing head continue to move forwardly on the main conveyer 15 without having anything done to them and without having their forward movement interrupted until they pass over the lifter cam 30. The lifter cam which is eccentrically mounted upon a drive shaft 130 is intermittently moved up between the belts 16 of the conveyer 15 to engage the leading edge of the row of untopped cakes simultaneous with the arrival of the row on the cam. Upon continued rotation of the eccentric cam 30, it lifts the leading edges up to and above the horizontal plane of the lower edge 131 of the cam 32 and into engagement with the arcuate cam surface 35. Simultaneously with this upward lifting of the leading edge of the untopped cakes by the cam 30, the trailing edge of a row of cakes 12a is engaged by pins 34 which extend radially from the pinwheel 31. Continued rotation of these pins 34 push the row of cakes 12a upwardly over the surface 35 of the cam plate until, when it reaches the upper edge of the cam surface, the cake is inverted and in a position in which what had formerly been the top surface of the cake is contacting the surface 36 of the pinwheel. By the time the cake is pushed upwardly over the top of the wheel, it is completely inverted and in this inverted position is pushed off the pinwheel onto the slide 40. The forward end 41 of the slide 40 is slotted so that the pins 34 of the pinwheel pass through the slots. Upon being pushed off the pinwheel onto the slide plate 40, the trailing edges of the cakes are engaged by the lugs 45 of the intermittently movable return conveyer 28. As may be seen most clearly in FIG. 1, these pins pick up the row of cakes as they come off the pinwheel onto the slide 40 and then continue to push the cakes upstream over the slide.

The lugs 45 of the conveyer 28 are mounted upon cross bars 135 of the conveyer 28 to form the rows 44. The cross bars in turn are supported at their opposite ends upon chains 136 which are movable over a drive sprocket 137 at the forward end and an idler sprocket 138 at the rear. The drive sprocket 137 is driven by a drive belt 139 from the drive shaft 130 of the lifter cam. This same drive belt also drives the pinwheel 31 so that the pinwheel and conveyer 28 all move intermittently in synchronization with the rotation of the lifter cam 30. The lifter cam drive shaft 130 is in turn driven by a belt 141 from a shaft 142. This shaft 142 is driven through an electrical clutch and brake mechanism 140 from the continuously rotating shaft 65 by a belt 143. The electric clutch on the shaft 142 is controlled by the memory circuit of FIG. 4 and the electric circuit of FIG. 5 so that each time a row of untopped cakes reaches the lifter cam the electric clutch on the shaft 142 is engaged long enough for the lifter cam 30 to go through one rotation. In one rotation of the cam shaft 130, the pinwheel rotates through a circumferential distance of approximately 1 ½ cookies diameter and the conveyer 28 moves upstream a distance of approximately one cookie diameter.

Layering Station

Each time that the intermittently movable conveyer 28 moves, it pushes one row of cakes 12a off the upstream end of the slide 40 and onto the stationary deadplate 50. This plate is secured at its opposite ends to the side plates 57, 58 of the frame. A row of cakes then rests upon this plate 50 until a row 12 of topped cakes passes beneath it. When a row of topped cakes passes beneath the deadplate 50 and the leading edge of that row 12 passes the forwardmost or downstream edge 145 of the plate, the pusher plate 53 moves forwardly at the same speed as the cakes 12 are moving forward on the conveyer 15. The pusher plate 53 is identical in shape to the pusher plate 14 and slides over the top of the deadplate 50. In the course of moving forward, it pushes the row of inverted untopped cakes off the deadplate 50 and onto the topped row of cakes.

Movement of the pusher plate 53 is actuated by a drive mechanism which is generally similar to that which actuates movement of the pusher plate 14. Specifically, an eccentric 146 on a drive shaft 147 is operable to oscillate a pusher plate drive shaft 149. This drive shaft is periodically coupled to the continuously rotating drive shaft 62 by a drive belt 148 and an electrical clutch and brake 149. Each time that the clutch 149 is engaged, it effects driving engagement of the eccentric to the shaft 147 for one rotation of the eccentric. In the course of one rotation of the eccentric, the connecting arm 150 oscillates the shaft 151 and through a connecting arm 152 moves the pusher plate 53 forwardly and then rearwardly back to its starting position.

Engagement of the electric clutch on shaft 147 is controlled by the memory circuit of FIG. 4 and the electric control circuit of FIG. 5. Each time that a spot or signal 153 on the tape 168 passes a layer control pickup head 155 of the control, it causes the clutch to be engaged for one revolution of the shaft 147.

After having been capped with a row of inverted untopped cakes, the completed sandwiches 12b continue to move forwardly on the conveyer 15 past the pinwheel 31 and beneath the leveling roller 55. The roller 55 is a continuously rotating one which is driven by a pair of gears 160, 161 from a drive shaft 162 which is in turn driven by a motor 163. The motor 163 drives the roller in rotation whenever the main drive motor 64 of the machine is rotating.

Operation

When cakes are fed into the machine 10 on an infeed conveyer (not shown), the cakes are arranged in columns and in rows. Generally, the infeed conveyer is a bakery oven cooling conveyer in which the rows of cakes are imperfectly aligned. The rows, though, generally are identifiable as rows although the spacing of the rows quite often varies from row to row. The incoming misaligned rows of cakes are deposited in the machine 10 on the deadplate defined by the rods 11 in front of the pusher plate 14. A predetermined time period after the weight of the row of cookies arriving in front of the pusher plate 14 causes the trigger wire 17 to be grounded against the rods 11, the pusher plate 14 moves forwardly and pushes the row of cakes in perfect row alignment onto the continuously moving main conveyer 15 of the machine. Simultaneously with forward movement of the pusher plate, the switch 84 is closed so as to alternately place signals 169 on the track 170 and signals 153 on the track 171 of the magnetic tape. These signals then control the electric clutches which synchronize the movement of the cookies through the machine on the main conveyer 15 with the movable machine elements. Specifically, the signals 153 on the track 171 control actuation of the icing control at the topping station 26 and actuation of the pusher plate 53 at the layering station 27. Signals 169 on the other band 170 of the tape control actuation of the lifter cam 30 and connected pinwheel 31 and return conveyer 28.

The drive to the magnetic tape is synchronized with the drive to the main conveyer 15 so that the belt of tape makes one revolution for each revolution of the conveyer 15. Prior to movement of a section of the belt beneath the recording heads 173, 174 of the machine, the old signals 169, 153 on the bands 170, 171 are erased by an eraser 175. Consequently, for each revolution of the main conveyer 15, new control signals representative of the position of the rows in the conveyer 15 are placed on the memory tape or belt 168.

As each alternate row of cakes 12 passes beneath the icing head 25 at the topping station 26, forward and upward movement of the head is initiated by the control circuit and simultaneously a control valve, as for example a slide valve (not shown), in the head 25 is opened so that topping is ejected onto each cake in the row 12. At the end of the forward stroke of the icing head, the valve of the head is closed and the head is returned upstream and lowered to its starting position preparatory to the arrival of the second following row of cakes beneath the head.

The alternate rows 12a of cakes pass the topping station without having any topping applied thereto. These alternate rows continue to move forwardly on the conveyer 15 until they move over the lifting cam 30. Simultaneously with the arrival of a row of untopped cakes over the lifter cam, a signal 169 on the magnetic tape passes opposite a diverter cam read-out head 176 of the memory system. This signal causes the electric clutch 140 on the shaft 142 to be actuated so as to cycle the cam 30 through one revolution. Simultaneously, the pinwheel 31 is rotated to engage and lift the cakes up over a guide surface 35 of the cam plate 32 and the return conveyer 28 is actuated to move the cakes on the slide plate 40 a distance approximately equal to one cake diameter and place a new row of cakes on the deadplate 50.

In the course of rotating through one revolution, the lifter or diverter cam 30 lifts the leading edge of the row of cakes located above it upwardly into and above the horizontal plane of the bottom edge 131 of the cam 32. Simultaneously, the pins 34 on the pinwheel 31 engage the trailing edge of the cakes and causes the row to move upwardly off the conveyer 15 over the guide surface 35 of the guide plate.

Upon continued motion of the pinwheel 31, the cakes continue to move upwardly, are inverted and then placed on the forward end of the slide 40. The lugs 45 on the return conveyer 28 then engage the rear edge of the cakes on the plate 40 and intermittently push those rows upstream one row at a time onto the deadplate 50.

As the topped row of cakes 12 moves forwardly beneath the deadplate 50, the electric clutch 149 on shaft 147 is caused to be engaged by movement of a signal 153 on the tape 168 moving beneath a cap control read-out head 155 of the memory system. This signal causes the clutch 149 to be engaged for one revolution of the shaft 147 and thereby effects one reciprocating stroke, first forward and then backward, of the pusher plate 53. The pusher plate 53 moves forwardly at the same speed and in synchronization with the topped cakes moving forwardly on the conveyer 15 beneath the deadplate 50 with the result that the untopped inverted cakes are pushed off the deadplate onto the top of topped cakes and are thereby perfectly placed on top of the lower cakes.

The completed sandwich 12b then continues to move forwardly on the conveyer 15 beneath the pinwheel 31 without the pins 34 of the pinwheel contacting the sandwich. The row of sandwiches 12b then passes beneath the leveling roller 55 and out the forward end of the machine.

The complete control circuit for carrying out the functions described hereinabove in accordance with signals derived from the read-out heads of the memory system is illustrated in detail in FIG. 5. That circuit per se, though, forms no part of the invention of this application and therefore it has not been described in detail herein. Persons skilled in this art, though, will readily appreciate the mode of operation of the circuit and will be able to duplicate it from the circuit diagram.

The primary advantage of this sandwich machine 10 is that it is capable of receiving misaligned and unevenly spaced rows of cakes from a cooling oven conveyer of a bakery and automatically converting those misaligned and unevenly spaced rows to completed sandwiches having filling located between layers of cakes or bakery products. Of course, while the invention has been described in relation to bakery products, it is equally applicable to other objects from which sandwiches are manufactured. Additionally, while I have only described one preferred embodiment of the invention, persons skilled in the art to which this invention pertains will readily appreciate numerous modifications which may be made without departing from the spirit of the invention. Therefore, I do not intend to be limited except by the scope of the appended claims.

Having described my invention, I claim:

1. A sandwich making machine for automatically making sandwiches having topping material located between two individual objects, said machine comprising,
   feeding means for receiving misaligned rows of objects and for automatically aligning said rows and feeding said aligned rows into said machine,
   first conveyor means for transporting said aligned rows of objects in a forward direction through said machine,
   topping applicator means located in the path of travel of said conveyor for applying topping to alternate rows of said objects,
   a sandwich station located downstream of said topping applicator means,
   pickup and inverting means located downstream of said layering station for picking up and inverting alternate untopped rows of said objects,
   second conveyor means located above said first conveyor means for transporting inverted untopped rows of objects from said pickup and inverting means back upstream to said sandwich layering station and,
   layering means at said sandwich station for placing rows of inverted untopped objects from said second conveyor means on the tops of alternate topped rows of objects passing said sandwich station.

2. The machine of claim 1 in which said first conveyor means is a continuously moving conveyor and in which,
   said layering means comprises a deadplate for receiving a row of inverted objects and a pusher plate for pushing said row of objects off of said deadplate onto a row of topped objects in synchronization with movement of a row of topped objects beneath said deadplate.

3. The machine of claim 1 in which said feeding means comprises a reciprocable pusher bar having pockets defined in the front side thereof for the reception of objects which are in misaligned rows when they arrive at said pusher bar, and
   trigger means for actuating said pusher bar and causing it to move forwardly in response to detection of a predetermined weight of objects in said pockets.

4. The machine of claim 3 in which said trigger means comprises a wire extending beneath said pockets which is electrically grounded by the weight of objects on said wire.

5. The machine of claim 1 in which said first conveyor means is an endless conveyor, said machine further comprising a synchronizing control means for synchronizing said first and second conveyor means, said topping applicator means, said pickup and inverting means, and said layering means.

6. The machine of claim 5 in which said synchronizing control means comprises a memory system including, a memory unit having an endless recording element of a length proportional to the length of said first conveyor means, means coupling said first conveyor means and said endless recording element so that said first conveyor means and said recording element each make even multiple revolutions in the same time, a recording means to apply a predetermined signal to the recording element at a position on said element upon placement of each row of objects on said first conveyor means, by said feeding means, and a pickup means responsive to said predetermined recorded signals on said recording element to actuate said topping applicator means, said pickup and inverting means, and said layering means in synchronization with the arrival of a row of objects at the appropriate position for actuation thereof.

7. The machine of claim 5 in which said memory unit includes a double channel memory element and said recording means is operable to record sequential signals on alternate channels, said pickup means being operable to actuate selected ones of said topping applicator means, said pickup and inverting means, and said layering means from signals from the two different channels.

8. The machine of claim 1 in which said pickup and inverting means comprises a stationary guide located above said first conveyor means and out of the path of travel of objects supported on said first conveyor means, a lifter element located beneath said first conveyor means and operable to lift alternate rows of objects into contact with said stationary guide means and a rotatable drive wheel for moving said alternate rows of objects upwardly over said stationary guide means from said first conveyor means to said second conveyor means.

9. The machine of claim 1 in which said layering means comprises a deadplate for receiving a row of inverted objects and a pusher plate for pushing said row of objects off of said deadplate onto a row of topped objects in synchronization with movement of a row of topped objects beneath said deadplate.

10. A sandwich making machine for automatically making sandwiches having topping material located between two individual objects, said machine comprising, infeeding means for feeding unevenly spaced rows of objects into said machine at whatever rate said rows arrive at said infeeding means, continuously moving first conveyor means for transporting unevenly spaced rows of objects in a forward direction through said machine, the spacing of said rows on said first conveyor means being determined by the rate at which said rows arrive at said infeeding means, topping applicator means located in the path of travel of said conveyor for applying topping to alternate rows of said objects, a sandwich station located downstream of said topping applicator means, pickup and inverting means for picking up and inverting alternate untopped rows of said objects, intermittently movable second conveyor means located above said first conveyor means for transporting inverted untopped rows of objects from said pickup and inverting means to said sandwich layering station, and layering means at said sandwich station for placing rows of inverted untopped objects from said second intermittently movable conveyor means on the tops of alternate topped rows of objects as said topped rows move past said sandwich station on said continuously moving first conveyor means.

11. The machine of claim 10 in which said infeeding means comprises a reciprocable pusher bar having pockets defined in the front side thereof for the reception of objects when they arrive at said pusher bar, and trigger means for actuating said pusher bar and causing it to move forwardly in response to arrival of a row of objects in front of said pusher plate.

12. The machine of claim 11 in which said trigger means comprises a wire extending beneath said pockets which is electrically actuated by the weight of objects on said wire.

13. The machine of claim 10 which further comprises a synchronizing control means for synchronizing said first and second conveyor means, said topping applicator means, said pickup and inverting means, and said layering means.

14. The machine of claim 13 in which said synchronizing control means comprises a memory system including, a memory unit having an endless recording element of a length proportional to the length of said first conveyor means, means coupling said first conveyor means and said endless recording element so that said first conveyor means and said recording element each make even multiple revolutions in the same time, a recording means to apply a predetermined signal to the recording element at a position on said element upon placement of each row of objects on said frist conveyor means by said feeding means, and a pickup means responsive to said predetermined recorded signals on said recording element to actuate said topping applicator means, said pickup and inverting means, and said layering means in synchronization with the arrival of a row of objects at the appropriate position for actuation thereof.

15. The machine of claim 14 in which said memory unit includes a double channel memory element and said recording means is operable to record sequential signals on alternate channels, said pickup means being operable to actuate selected ones of said topping applicator means, said pickup and inverting means, and said layering means from signals from the two different channels.

16. The machine of claim 10 in which said pickup and inverting means comprises a stationary guide located above said first conveyor means and out of the path of travel of objects supported on said first conveyor means, a lifter element located beneath said first conveyor means and operable to lift alternate rows of objects into contact with said stationary guide means and a drive system for moving said alternate rows of objects upwardly over said stationary guide means from said first conveyor means to said second conveyor means.

17. The machine of claim 10 in which said layering means comprises a deadplate for receiving a row of inverted objects and a pusher plate for pushing said row of objects off of said deadplate onto a row of topped objects in synchronization with movement of a row of topped objects beneath said deaplate.

18. A sandwich making machine for automatically making sandwiches having topping material located between two individual objects, said machine comprising, infeeding means for feeding unevenly spaced rows of objects into said machine at whatever rate said rows arrive at said infeeding means, continuously moving first conveyor means for transporting rows of objects in a forward direction through said machine, topping applicator means located in the path of travel of said conveyor for applying topping to alternate rows of said objects, a sandwich station located downstream of said topping applicator means, pickup and inverting means for picking up and inverting alternate untopped rows of said objects, intermittently moveable second conveyor means located above said first conveyor means for transporting inverted untopped rows of objects from said pickup and inverting means to said sandwich layering station, layering means at said sandwich station for placing rows of inverted untopped objects from said second intermittently moveable conveyor means on the tops of alternate topped rows of objects as said topped rows move past said sandwich station on said continuously moving first conveyor means, and synchronizing control means including a memory circuit for synchronizing said first and second conveyor means, said topping applicator means, said pickup and inverting means and said layering means.

19. A sandwich making machine comprising, feeding means for receiving misaligned and unevenly spaced rows of objects from an infeed conveyor and for automatically aligning said rows and feeding said aligned unevenly spaced rows into said machine, the spacing of said unevenly spaced rows when fed into said machine being determined by the rate at which said rows arrive at said infeeding means, main conveyor means for receiving said alinged unevenly spaced rows of objects and for transporting said aligned unevenly spaced rows of objects in a forward direction through said machine, topping applicator means located in the path of travel of said conveyor for applying topping to alternate rows of objects, and layering means for placing rows of untopped objects on the tops of alternate topped rows.

20. The sandwich making machine of claim 19 in which said feeding means comprises a reciprocable pusher bar having pockets defined in the front side thereof for the reception of objects which are in misaligned rows when they arrive at said pusher bar, and trigger means for actuating said pusher bar and causing it to move forwardly in response to detection of the arrival of objects in said pockets.

21. The sandwich machine of claim 20 in which said trigger means is responsive to a predetermined weight of objects in said pockets.

22. The machine of claim 21 in which said trigger means comprises a wire extending beneath said pockets which is electrically grounded by the weight of objects on said wire.

23. The machine of claim 19 in which said main conveyor means is a continuously moving endless conveyor.

24. The sandwich making machine of claim 23 further comprising a synchronizing control means for synchronizing said feeding means, said topping applicator means, and said layering means.

25. The machine of claim 24 in which said synchronizing control means comprises a memory system including, a memory unit having an endless recording element of a length proportional to the length of said main conveyor means, means coupling said main conveyor means and said endless recording element so that said main conveyor means and said recording element each make equal multiple revolutions in the same time, a recording means to apply a predetermined signal to the recording element at a position on said element upon placement of each row of objects on said main conveyor means by said feeding means, and a pickup means responsive to said predetermined recorded signals on said recording element to actuate said topping applicator means in synchronization with the arrival of a row of objects beneath said applicator means.

26. The sandwich making machine of claim 19 further comprising a synchronizing control means for synchronizing said feeding means, said topping applicator means, and said layering means.

27. The machine of claim 26 in which said synchronizing control means comprises a memory system including, a memory unit having an endless recording element of a length proportional to the length of said main conveyor means, means coupling said main conveyor means and said endless recording element so that said main conveyor means and said recording element each make equal multiple revolutions in the same time, a recording means to apply a predetermined signal to the recording element at a position on said element upon placement of each row of objects on said main conveyor means by said feeding means, and a pickup means responsive to said predetermined recorded signals on said recording element to actuate said topping applicator means in synchronization with the arrival of a row of objects beneath said applicator means.

\* \* \* \* \*